Patented Nov. 5, 1940

2,220,641

UNITED STATES PATENT OFFICE 2,220,641

POROUS METAL FILTER ELEMENT

James H. Davis, Dayton, Ohio, assignor to General Motors Corporation, Detroit, Mich., a corporation of Delaware No Drawing. Original application June 18, 1936, Serial No. 85,889. Divided and this application January 28, 1938, Serial No. 187,405

5 Claims. (Cl. 210—205)

The present application is a division of my copending application S/N–85,889, filed June 18, 1936.

This invention relates to porous metallic filter elements.

An object of this invention is to provide a thin finely porous metallic sheet which is adapted for use as a filter element. Such filter elements may be used for removing extremely fine solid particles from a liquid, for instance for clarifying coffee by removing the very fine coffee particles therefrom.

Heretofore filter elements for clarifying a liquid of dust-like particles have been made of non-metallic materials such as matted or woven fibers such as paper or textile fabrics, or porous skins. After the pores of such non-metallic filter elements have become more or less clogged with solid particles it is difficult to remove such solid particles due to the relative weakness and easy destructibility of such non-metallic filter elements and hence they are usually discarded after only a limited period of use. The metallic filter elements of this invention may be cleansed by burning the solid particles clogging same by means of a hot blast at a temperature which will not destroy the porous metal structure. Also the metallic filter elements of this invention may be cleansed of some kinds of non-metallic foreign particles by the chemical action at a suitable temperature of chosen gases or liquids which will attack the non-metallic particles but will not attack the metal structure of the filter element. In these respects a metallic filter element made according to this invention has distinct advantages over previously known non-metallic filters.

Further advantages of the filter elements of this invention over known flexible forms of filter elements are:

(1) Greater strength and rigidity to sustain the pressure of the liquid being filtered;

(2) Greater uniformity in degree of porosity or fineness of pores;

(3) Economy of manufacture of a large number of filter elements all having the same degree of porosity.

(4) Economy of manufacture of a metallic filter element of any suitable metals or metal alloys so that the metal of the filter element will not contaminate the liquid being filtered, or will not be corroded by the liquid being filtered.

Further objects and advantages of the present invention will be apparent from the following description:

As a specific example of making a filter element according to this invention the following is given:

A homogeneous mixture of finely divided nickel and copper powders is prepared having about 68% nickel and 32% copper therein. The degree of fineness of the metal powder determines to some extent the degree of porosity of the final filter element, that is, the average size of the pores through the filter element. The size of the nickel and copper powders may vary from powder screened thru a wire mesh screen having about 40 openings per linear inch to 300 or more openings per inch.

The powder mixture of nickel and copper powders is spread loosely upon a hard smooth surface of a graphite mold to form a loose powder layer of substantial depth. The top of the powder is scrapped off to a smooth level surface by any suitable means to form a loose uncompacted layer of powder having the desired depth, for example $\frac{1}{32}$ inch deep. The mold and uncompacted powder layer thereon is then heated in a non-oxidizing or reducing atmosphere in a suitable furnace at a temperature of 2025° F. for a short time (about 8 minutes) to cause the nickel and copper particles to alloy or sinter together to form a highly porous rigid metal sheet of an alloy having Monel metal composition and which will resist corrosion to a high degree. After this sintering step is completed, the porous metal sheet is cooled in a non-oxidizing or reducing atmosphere and then readily lifted from the hard graphite surface upon which it lay during sintering. This results in a highly porous metal membrane which may be used as a filter element having the advantages described above. If the metal powders used in this process are quite coarse, for instance having a coarseness determined by a 40 mesh screen, the final porous membrane will have correspondingly relatively large pores therethrough to more freely permit the passage of liquid therethrough. If the metal particles are so small as to pass through a 150 mesh screen the final porous membrane will have considerably smaller pores, and so on for still smaller metal particles.

Any other desired proportions of copper and nickel may be used instead of the proportions described above to form any other desired copper-nickel alloys, for instance 95 parts copper and 5 parts nickel. Also various other metals or combinations of metals may be used to give the desired metal alloy in the final porous membrane, in each case the sintering temperature used being such as will cause the metal powders being used to alloy or sinter together without such melting as will destroy the high porosity of the final metal structure. In order to provide a highly porous bronze membrane any desired proportions of copper and tin metal powders may be used in the process described above. For instance from about 90% to about 97% copper powder may be used with from 10% to 3% of tin powder. The sintering temperature for copper-tin mixtures is preferably quite close to 1500° F.

If desired, the highly porous metal membrane made by the process described above may be somewhat compacted after the sintering step to control its porosity or density. This is preferably done by passing the highly porous membrane between pressure rolls or by any other suitable compression method. Obviously the degree of porosity of the highly porous metal membrane may be reduced as much or as little as desired by such rolling of the porous metal structure.

Porous metal membranes having a very high degree of uniformity of porosity may be rapidly and very economically made by the method of this invention. Such membranes may be used in general for filtering foreign matter from a liquid or from a gas or air where the size of the foreign particles are very minute. As examples, they may be used in filters for the refrigerant in household refrigerators, oil filters in automobile engines, gasoline filters, etc.

While the embodiment of the present invention as herein disclosed, constitutes a preferred form, it is to be understood that other forms might be adopted, all coming within the scope of the claims which follow.

What is claimed is as follows:

1. A filter element comprising a relatively thin highly porous sheet of a homogeneous alloy having sufficient porosity to permit a liquid to freely pass therethrough, said sheet being formed by sintering together a thin layer of the metallic constituents of the alloy in a non-compacted intimately mixed condition.

2. A filter element comprising a relatively wide thin highly porous sheet of a homogeneous alloy of copper and nickel powders, said alloy being formed by sintering a thin layer of intimately mixed non-compacted copper and nickel powders.

3. A filter element comprising a thin highly porous sheet of a homogeneous bronze alloy having sufficient porosity to permit a liquid to freely pass therethrough, said alloy being formed by sintering together a thin layer of intimately mixed non-compacted copper and tin powders.

4. A filter element comprising a thin highly porous sheet of bronze having sufficient porosity to permit free fluid flow therethrough, said bronze having an analysis wherein copper is present in the range of from 90 to 97% and wherein tin is present in the range of from 10 to 3%.

5. A filter element comprising a relatively thin highly porous sheet of a homogeneous alloy having sufficient porosity to permit liquid to freely pass therethrough, said sheet being formed by sintering together a substantially uniform layer of metal powder in the loose noncompacted condition upon a nonadhering supporting surface.

JAMES H. DAVIS.